United States Patent [19]
Schiefer et al.

[11] Patent Number: 5,758,146
[45] Date of Patent: May 26, 1998

[54] METHOD AND APPARATUS FOR OPTIMIZING DATA RETRIEVAL USING INDEX SCANNING

[75] Inventors: Bernhard Schiefer, Scarborough, Canada; Arun Narasimha Swami, Cupertino, Calif.

[73] Assignee: International Business Machines Corporation, Armonk, N.Y.

[21] Appl. No.: 440,558

[22] Filed: May 12, 1995

[30] Foreign Application Priority Data

May 20, 1994 [CA] Canada .................. 2124094

[51] Int. Cl.$^6$ .................. G06F 17/30
[52] U.S. Cl. .................. 707/2; 707/3
[58] Field of Search .................. 395/600, 602, 395/603

[56] References Cited

U.S. PATENT DOCUMENTS

| | | | |
|---|---|---|---|
| 3,568,155 | 3/1971 | Abraham | 395/600 |
| 3,623,018 | 11/1971 | Evans | 395/600 |
| 4,769,772 | 9/1988 | Dwyer | 395/600 |
| 4,774,657 | 9/1988 | Anderson et al. | 395/600 |
| 4,829,427 | 5/1989 | Green | 395/600 |
| 5,043,872 | 8/1991 | Cheng et al. | 364/200 |
| 5,091,852 | 2/1992 | Tsuchida | 395/600 |
| 5,301,317 | 4/1994 | Lohman et al. | 395/600 |
| 5,379,424 | 1/1995 | Morimoto et al. | 395/600 |
| 5,404,510 | 4/1995 | Smith et al. | 395/600 |
| 5,548,770 | 8/1996 | Bridges | 395/600 |

OTHER PUBLICATIONS

Lee et al., "Adaptive Selection of Access Path and Join Method", Proceedings of the 13th Annual International Computer Software and Applications Conference, Orlando, Florida, 20–22 Sep., 1989, pp. 250–256.

Blakeley et al., "Join Index, Materialized View, and Hybrid–Hash Join: A Performance Analysis", Sixth International Conference on Data Engineering, Los Angeles, California, 5–9 Feb. 1990.

Primary Examiner—Paul R. Lintz
Attorney, Agent, or Firm—Sterne, Kessler, Goldstein & Fox, P.L.L.C.

[57] ABSTRACT

Described herein is a system and method for operating a data processing system having a processing unit and physical storage in which data is stored. The storage is connected to the processing unit for transferring pages of data to the processing unit. The storage contains at least one database table stored on a plurality of pages. Each data base table has a plurality of rows of data, and one or more indexes composed of a sequence of entries which reference the rows. The processing unit has a memory associated with it. A portion of the memory comprises a buffer pool for caching data pages from the table. The method operates by scanning one or more selected indexes in determining the relationship of the number of data transfers required to traverse all or a portion of each selected index for a selected range of buffer pool sizes. Then, a description of this relationship is stored.

15 Claims, 5 Drawing Sheets

METHOD AND APPARATUS FOR OPTIMIZING DATA RETRIEVAL USING INDEX SCANNING

BACKGROUND OF THE INVENTION

1. Technical Field

This invention relates to information management, and more particularly to data base management systems.

2. Description of the Prior Art

A data base management system is a computer system for recording and maintaining data. In a relational database management system data is stored as rows in a table, with collections of tables being called data bases. One can manipulate (select, update, insert, or delete) data by issuing a request or command (called a query) to the data base. In a relational data base management system's data query and manipulation language, such as SQL, requests are nonprocedural (also referred to as declarative). That is, users simply specify what is wanted, rather than specifying how to accomplish it. The system's optimizer must determine the optimal way (or access path) to get the data for the user. One way to access data is to sequentially scan every row in a table for those rows which match the search criteria. This is known as a table scan, because the entire table is scanned in sequence from beginning to end.

Rows of data are stored on pages on physical storage devices, usually disk drives or files. Data is transferred between the physical storage and the computer system's processing unit page by page even though only a single row may be needed from a given page. The time it takes to transfer data between physical storage and the processing unit is usually many times greater than the time it takes to process the data in the processing unit. To manipulate data in a relational data base, the rows must first be transferred from physical storage to the processing unit, then processed in the processing unit, and finally transferred back to physical storage. Because transferring takes so much longer than processing, the total time required to manipulate the data can be dramatically reduced if the number of transfers can be reduced.

Most relational data base systems maintain indexes for their tables. An index is a list stored separately from the rows and used to access the rows in a selected order. An index comprises many index entries, each containing a key value and an identifier of or pointer to one or more rows which contain that key value. Indexes are physically stored on index pages.

One method of storing an index's pages is as a B-tree, with a root page, intermediate pages depending from the root, and leaf pages depending from the intermediate pages at the lowest level of the tree. The term B-tree is short for "balanced tree", and refers to the balanced or roughly equal number of pages to which each such root or intermediate index page points. The B-tree's leaf pages contain the index entries. The depth of the B-tree's index defines the number of levels in the index. To scan a table's rows in the order specified by the index, the index's leaf pages are scanned sequentially and the index entries on each leaf page are used to access the rows in the index's order. This scan is called an index sequential scan, or index scan for short. In the prior art, there are different types of index organizations: perfectly clustered, nonclustered, and partially clustered. An index is perfectly clustered if, when scanning the index leaf pages sequentially, each data page is accessed only once. For this to occur the data lows, when accessed in index order, must be in the same sequence as the sequence in which they are stored in the data pages of physical storage. An index scan through a clustered index (also referred to as a clustered index scan) is fast because the number of data page accesses is minimized since there are no duplicate accesses to the same data page and because both the index leaf pages and the data pages can be accessed sequentially rather than at random.

An index is nonclustered if, when scanning the index leaf pages sequentially, the data pages are accessed back and forth at random. Index scans through nonclustered indexes (also referred to as nonclustered index scans) are extremely slow, because there is much thrashing back and forth between data pages is the index requires separate data pages to be randomly accessed and transferred into and out of the processing unit's main memory but only accesses one row from the many on each such page.

A partially clustered index is neither perfectly clustered nor non-clustered. A partially clustered index is characterized by its degree of clustering described below.

When an index's key is used as a search criterion in a query, that index can often provide an efficient access path for identifying these data rows which satisfy or match the search criteria. When a complex query having several criteria is presented, the data base system's optimizer often has a number of indexes available, each having a key the same as one of the search criteria. The optimizer must then select the best index with which to access the data rows.

The prior art teaches the desirability of clustered index scans as access paths for queries. However until the invention disclosed in U.S. Pat. No. 5,043,872, which issued Aug. 27, 1991 to International Business Machines Corporation physical clustering of data was considered an all-or-nothing proposition. Without taking into account the degree of clustering, the optimizer could not discriminate between relatively more or less clustered indexes, and might choose a less efficient access path, resulting in unnecessary physical data page accesses. The invention disclosed in U.S. Pat. No. 5,043,872 measures degrees of clustering of indexes and provides a method for using such degrees of clustering in selecting access paths for data base management systems. It's objective is to select access paths by estimating the page accesses required during an index scan based on the degree of clustering of the index.

It accomplished this by first calculating a clustering coefficient which was directly proportional to the number of rows which, when in index order, are in a sequence which is the same as the sequence in which they are stored on the data pages. This clustering coefficient was then used to estimate the number of pages to be accessed during the index scan. The number of page accesses could then be used to select an access path for a query, join, or other indexed data base operation.

SUMMARY OF THE INVENTION

While the reference prior invention contributed to a significant improvement in selecting faster access paths the prior invention failed to take into account the portion of the processing unit's main memory dedicated to caching data pages from a table. This portion is usually referred to as a buffer pool. By failing to account for the size of the buffer pool and by using a single number to estimate the behaviour of the performance of an index a significant deviation between the predicted number of transfers and actual transfers can occur. This deviation or error between the estimated and actual transfers required is important to a database user as an error in the estimation can result in the selection of an index which is not optimal for the query and thus incur unnecessary additional processions steps and attendant costs.

We have found unexpectedly that a significant number of indexes are highly sensitive to the size of the buffer pool; that is, a small increase in the size of the buffer pool can result in a significant reduction in the number of transfers of data between physical storage and the buffer pool. This results in faster performance and reduced processing costs as may be readily appreciated.

The present invention disclosed herein provides a more accurate method of estimating the number of data page transfers required by taking into account the size of the buffer pool available, at the time access strategy is being developed (i.e. when the optimizer is selecting the best index).

The invention provides significant increases in performance over the prior art by providing a method for reducing the error in predicting the amount of transfers (i.e. I/O) required to scan a table using an index for the table.

In a typical use of the invention a data base user loads the pertinent data that is to be handled by the database and creates indexes to the data. The user then collects statistics on the tables and indexes to determine the size and other characteristics of the tables and indexes. One important statistic about each index is how many data transfers are required to traverse the entire index and read the corresponding data pages for various sizes of buffer pools.

In one embodiment of this invention each of these indexes is read and then the I/O requirements for each index are modelled for a range of buffer sizes. This defines the relationship between I/O requirements and buffer sizing for each index. The relationship between the quantity of data and the size of cache and its effect on the number of data page transfers (I/O operations) required is used by the invention. The relationship can be represented as a curve on a graph using the buffer size as one axis of measurement and the number of data page transfers relative to buffer size as the other.

A specific embodiment of the method of the invention approximates the curve with a set of line segments for which the endpoints are stored for the purposes of use by the invention.

Once the statistics have been gathered users can submit queries. For each query that the user runs the optimizer needs to choose a method of accessing the required rows in each table referenced in the query as a query usually contains one or more table references. For each table that the user requires to be referenced the optimizer determines the cost of scanning the whole table, as well as using each of the indexes that exist for that table. Given the search criteria imposed by the user and the share of the buffer pool of the computer system allotted to the user the invention herein estimates the data page trainers (I/O requirements) using (the curve representing) the relationship between I/O requirements and buffer pool size. Additional calculations may be made by the optimizer to take into account CPU processing costs in addition to the I/O costs. This results in a final estimated cost of using each index which the optimizer uses to determine which index or indexes to use and optionally the order of use in order to optimize costs.

BRIEF DESCRIPTION OF THE DRAWINGS

FIG. 5 is a flowchart illustrating an embodiment of the invention.

BACKGROUND

Figure 1:
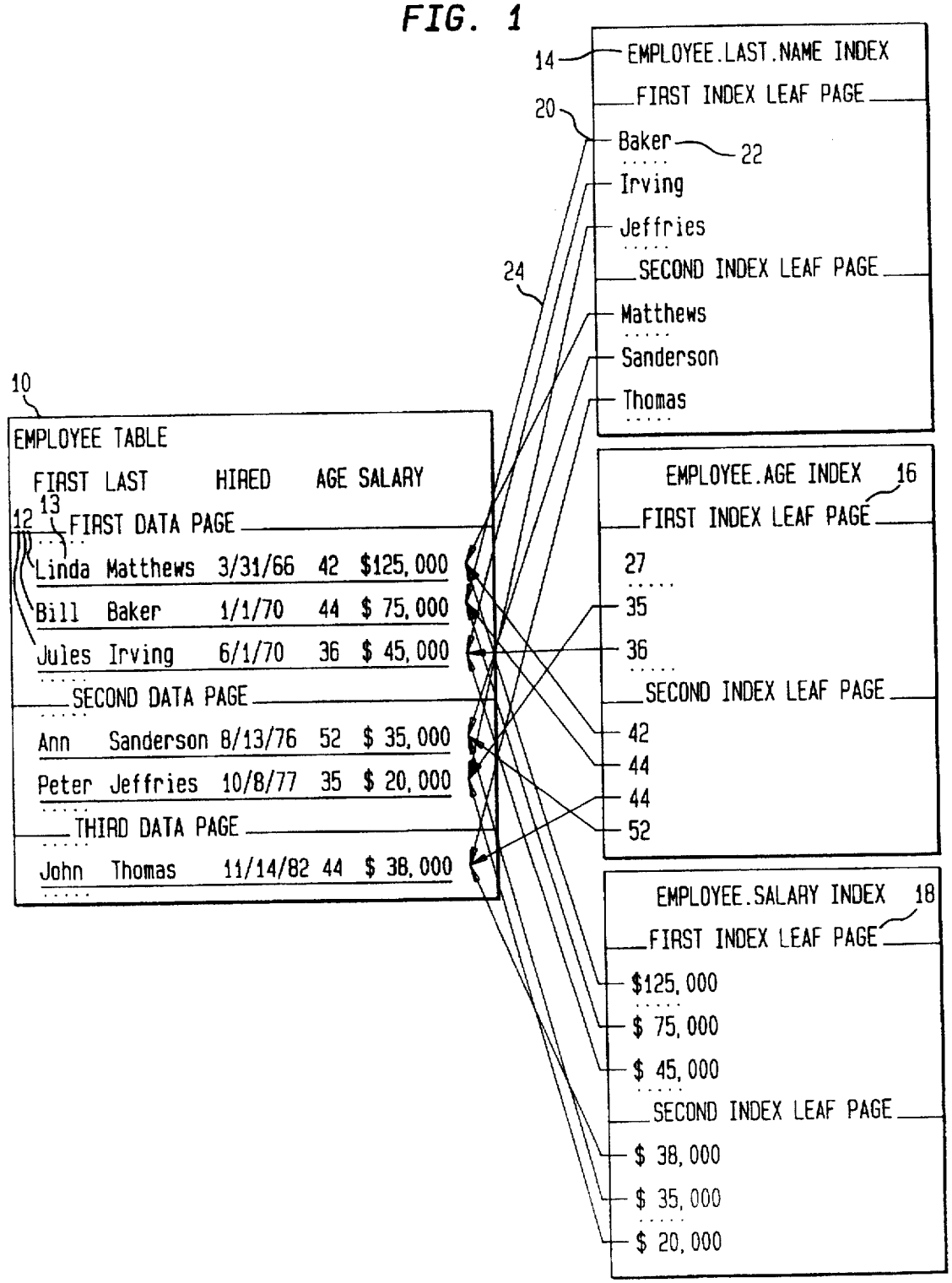
FIG. 1 illustrates a relational data base table and index.
Figure 2:
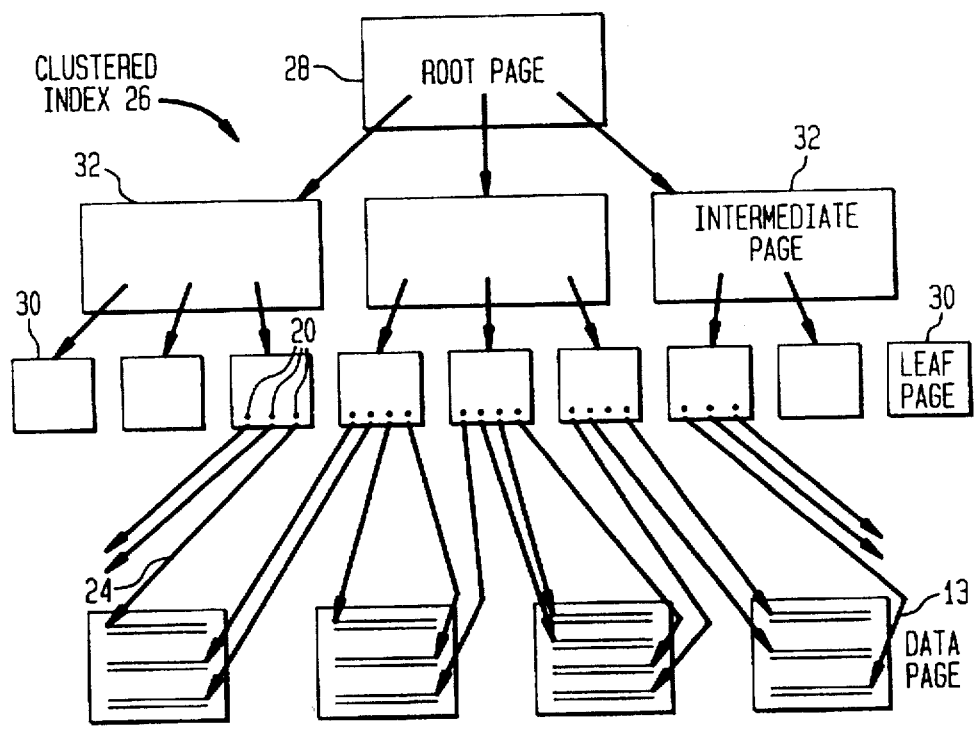
FIG. 2 illustrates a perfectly clustered Balanced-tree index.
Figure 3:
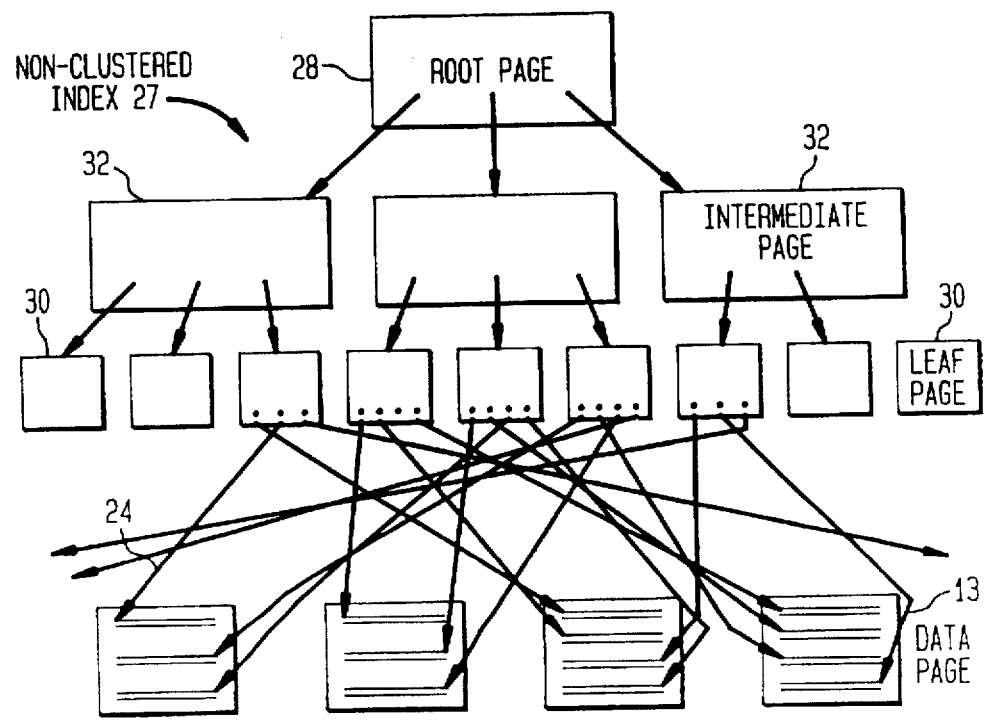
FIG. 3 illustrates a nonclustered Balanced-tree index.

As seen in FIG. 1, a data base table 10 having rows 12 of employee data might be physically stored on data pages 13 in the order in which the employees were hired. Such a table 10 could have a first index 14 for placing the rows 12 in increasing (ascending) alphabetical order by last name, a second index 16 for placing the rows in ascending order by age, and a third index 18 for placing the rows in decreasing (descending) order by salary. Each index 14,16,18 comprises many index entries 20, each index entry containing a key value 22 (e.g., last name, age, or salary) and an identifier of or pointer 24 to one or more rows 12 which contain that key value. The indexes 14,16,18 are physically stored on index pages. FIG. 2 shows a perfectly clustered B-tree index 26. The root page 28 of the tree is at the top of the drawing, the leaf pages 30 are along the bottom, and intermediate pages 32 are interposed between the root and the leaves.

For purposes of understanding this invention, consider the following query applied to the employee table 10 of FIG. 1: SELECT Last.names FROM Employee TABLE Where Age>=40 AND Salary>=$40,000. This query requests the last names of all employees at least 40 years old and earning $40,000 or less. The conditions that age be greater than or equal to 40 and salary be less than or equal to $40,000 are the search criteria for this query. It will be seen from inspecting the employee table 10 that only Thomas and Sanderson satisfy both of these criteria.

The simplest access path by which the optimizer could determine which rows satisfy these search criteria is a table scan, i.e., a sequential scan through all of the rows 12 in the table 10 in the order in which they are stored, checking each row to determine whether it matches the search criteria. For the abbreviated employee table 10 of FIG. 1, a table scan would require transferring three data pages to and from main memory, and processing all six rows of the table.

The same query can be satisfied by performing a partial index scan using the Age index 16 to access only the rows meeting the search criterion Age>=40.

Using this access path, the Age index 16 would be searched for the first entry matching the age search criterion, i.e., the first entry equal to or greater than 40. An index scan would then be performed from that point in the index onward. The first data page would be randomly accessed and the Matthews row processed and discarded, followed by the third data page (again randomly) for the Thomas row, the first data page again for the Baker row, and finally the second data page for the Sanderson row. This is an example of a completely nonclustered index scan, in which each row identified by the index as meeting one of the search criteria requires a random page access for that row to be processed. The total cost of this nonclustered index scan is as follows:

Index paging: 1 page

Data paging: 4 pages

Total: 5 pages

A clustered index scan through a perfectly clustered index is not available as an option in this example. Neither of the indexes corresponding to the search criteria, the Age index 16 and the Salary index 18, is perfectly clustered.

It will be seen from inspection of FIG. 1 that the Salary index 18, while not completely clustered, is nearly so. An index scan through the Salary index 18 would be less time consuming, and therefore more efficient, than either the table scan through the entire employee table 10 or the index scan through the Age index 14, discussed above. Using the Salary index 18 as the access path for this query, the index would be scanned for the first entry matching the Salary search criterions, i.e., with a salary equal to or less than $40,000. The first such entry appears on the second index page of the Salary index 18. An index scan would then be performed through the remainder of this index, and each row identifier by the index processed according to the query. Thus, the third data page would be transferred (random access) and the Thomas row processed and selected. Next, the second data page (again, random access) would be transferred, and the Sanderson row processed and discarded. Finally, the Jeffries row would be processed, which would not require accessing a data page since the Jeffries row is clustered next to the Sanderson row. The total cost of using the Salary index 18 as the access path is therefore:

Index paging=1 page

Data paging=2 pages

Total=3 pages

Thus, the relatively clustered Salary index 18 provides a much better access path for this sample query than the completely nonclustered Age index 16.

In a realistic setting, the number of rows and pages involved would be many orders of magnitude larger than the numbers used in the illustrative example above.

In a data base table of 1,000,000 rows, a query having search criteria which ultimately select two percent (2%) of the rows, and the choice of a sequential table scan, a completely nonclustered index scan, or an index scan which has a degree of clustering of ninety percent (90%), the table's rows being spread over 50,000 data pages and the indexes' entries over 5,000 pages, the following rough estimates of the number of page transfers required for accessing the table can be made:

| Sequential scan | |
|---|---|
| Data paging | 50,000 pages |
| Total | 50,000 pages |
| Nonclustered index scan | |
| Index paging = 2% of 5,000 pages | 100 pages |
| Data paging = 2% of 1,000,000 rows × 1 page per row | 20,000 pages |
| Total | 20,100 pages |
| Index scan with 90% clustering | |
| Index paging = 2% of 5,000 pages | 100 pages |
| Clustered data paging = 90% of 2% of 50,000 pages | 90 pages |
| Nonclustered data paging I/O | |
| 10% of 2% of 1,000,000 rows × 1 page per row | 2,000 pages |
| Total | 2,190 pages |

The optimal access path is clearly the one through the ninety percent (90%) clustered index.

Each page transfer takes a certain amount of processing time so clearly an access path with fewer page transfers will take less time.

Degrees of Clustering

The degree of clustering is defined as the number of clustered rows in a given index divided by the total number of rows in the table. Thus, the degree of clustering is proportional to the number of rows which when in index order is in the same sequence as that sequence in which they are stored.

The number of clustered rows may be determined by performing an index scan through the entire table. A row is considered to be clustered if it is physically stored immediately following the row previously specified by the index. If all rows of an index are clustered according to this definition, then the index is compeletely clustered. If ninety percent (90%) of the table's rows immediately follow their predecessor rows in index order, then the index is ninety percent (90%) clustered.

Access Path Selection

The optimizer's task, when presented with a query into a data base table, is to select the fastest access path for that query. The optimizer can choose between a sequential table scan through the entire table, or an index scan using an index corresponding to one of the query's search criteria. Where two or more search criteria have corresponding indexes, the optimizer must choose between these alternative candidate indexes.

Search criteria (predicates) on the index columns which make up the index can be used to restrict the records (Rows) that are fetched. Such index scans are called partial index scans as opposed to full index scans. For a partial index scan, the optimizer can estimate the selectively, i.e., the number of records that are expected to be retrieved in the index scan. Methods for estimating the selectivity are well known [1] and are not discussed here. For an access plan involving an index scan, the optimizer has to estimate the number of data page transfers (fetches). The number of page fetches from disk may depend on the number of buffer pool slots available to hold the pages fetched. In most relational database systems, the buffer pool is assumed to be managed using the Least Recently Used (LRU) algorithm.

For a table scan, the number of page fetches is exactly the number of pages in the table T because each page is accessed exactly once. Note that this is independent of the value of the buffer pool size B. Let the number of data pages accessed during the scan of an index I be denoted by A. A data page is accessed if at least one record on the page is examined during the scan. The value of A depends on the number of records (rows) retrieved in the index scan and the placement of the retrieved records in the pages of the table. It does not depend on B. The number of pages fetched while scanning the index I is denoted by F, which depends on A and may depend on B as shown below.

Recall that the placement of the retrieved records in the pages of the table determines how clustered the index is. An index is called a clustered index if the records (rows) are stored in the table in the order of the index column. When the records are retrieved in the order of values of the index column, no page is accessed more than once. Hence, F=A independent of B. Note that if this is a partial scan, $A<T \rightarrow F<T$.

As we have said an index is said to be unclustered if the rows (records) are not stored in the table exactly in the order of the index column. When the rows are retrieved in the order of values of the index column, a page may be accessed more than once. The page may be replaced in the buffer pool between two accesses to the page due to other page transfers (fetches) in the interim.

SPECIFIC EMBODIMENT OF THE INVENTION

The Effect of Buffer Pool Size

We have discovered one significant parameter that affects F is the value of B. As B increases, the size of the buffer pool may be able to compensate for any lack of order in the page reference pattern. When B approaches A, disorganization in the key sequence of records becomes irrelevant. Similarly, as the buffer becomes smaller, even a slightly unclustered index will have to redo many page transfers, since the accessed pages will already have been discarded by some previous reference. In the worst case each new record will require an additional page fetch. Bounds can therefore be placed on F as follows:

$A<=F<=N$, where N is the number of rows retrieved from table T.

Some indexes are greatly affected by even a small change in the size of the buffer pool. The degree to which the changes occur depends on the amount of disorganization that exists. Note that if there are multiple records (rows) on a page and the index is highly unclustered, an index scan may result in multiple accesses to pages. The result is a large value for F, if B (the buffer pool size) is sufficiently small compared to A (The number of pages accessed (ie. the number of page transfers)).

Figure 4:
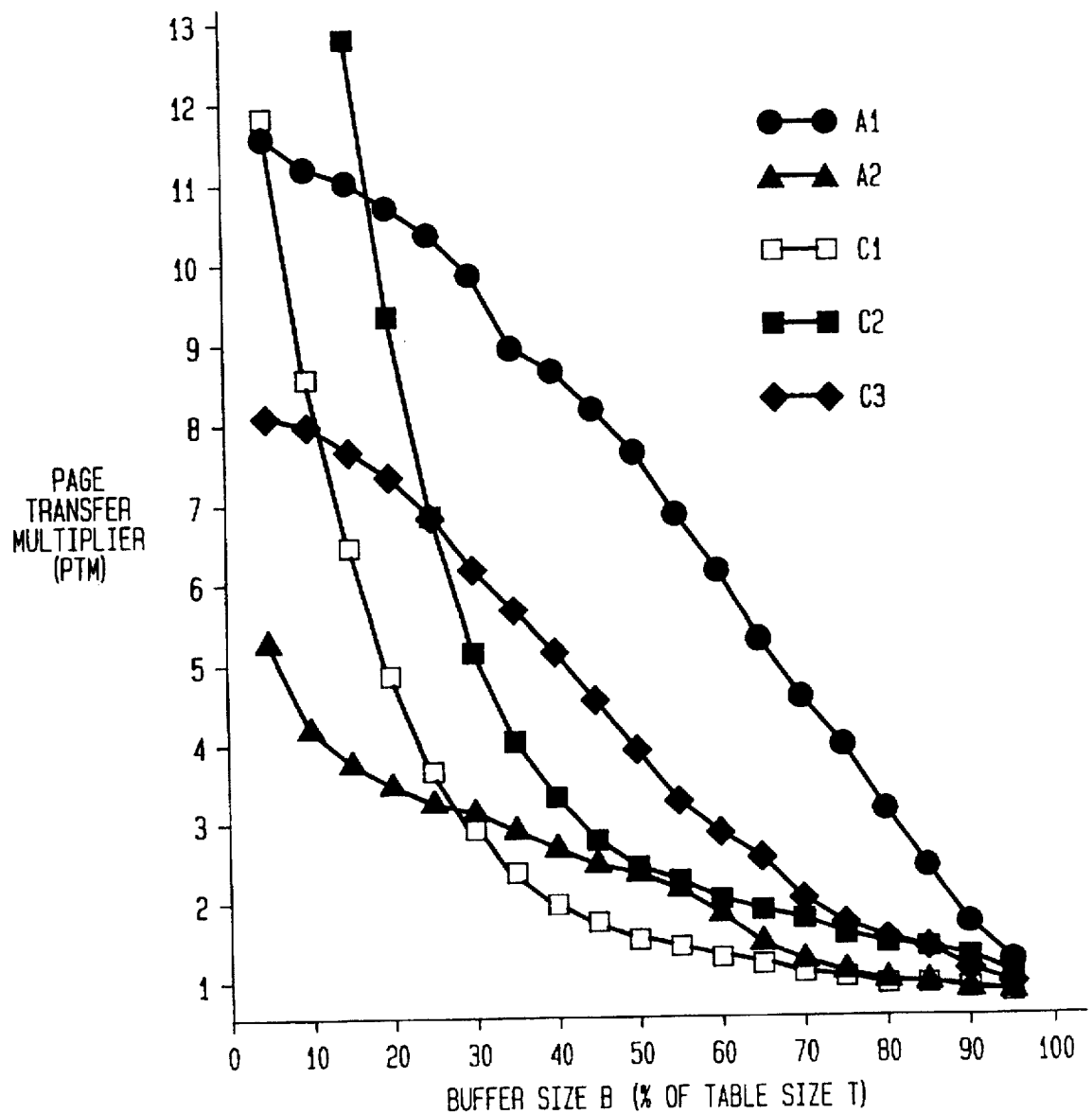
FIG. 4 is a graph illustrating the relationship between the number of page transfers performed and the size of the buffer pool for a set of indexes for a sample set of tables of different sizes (T).
Figure 5A:
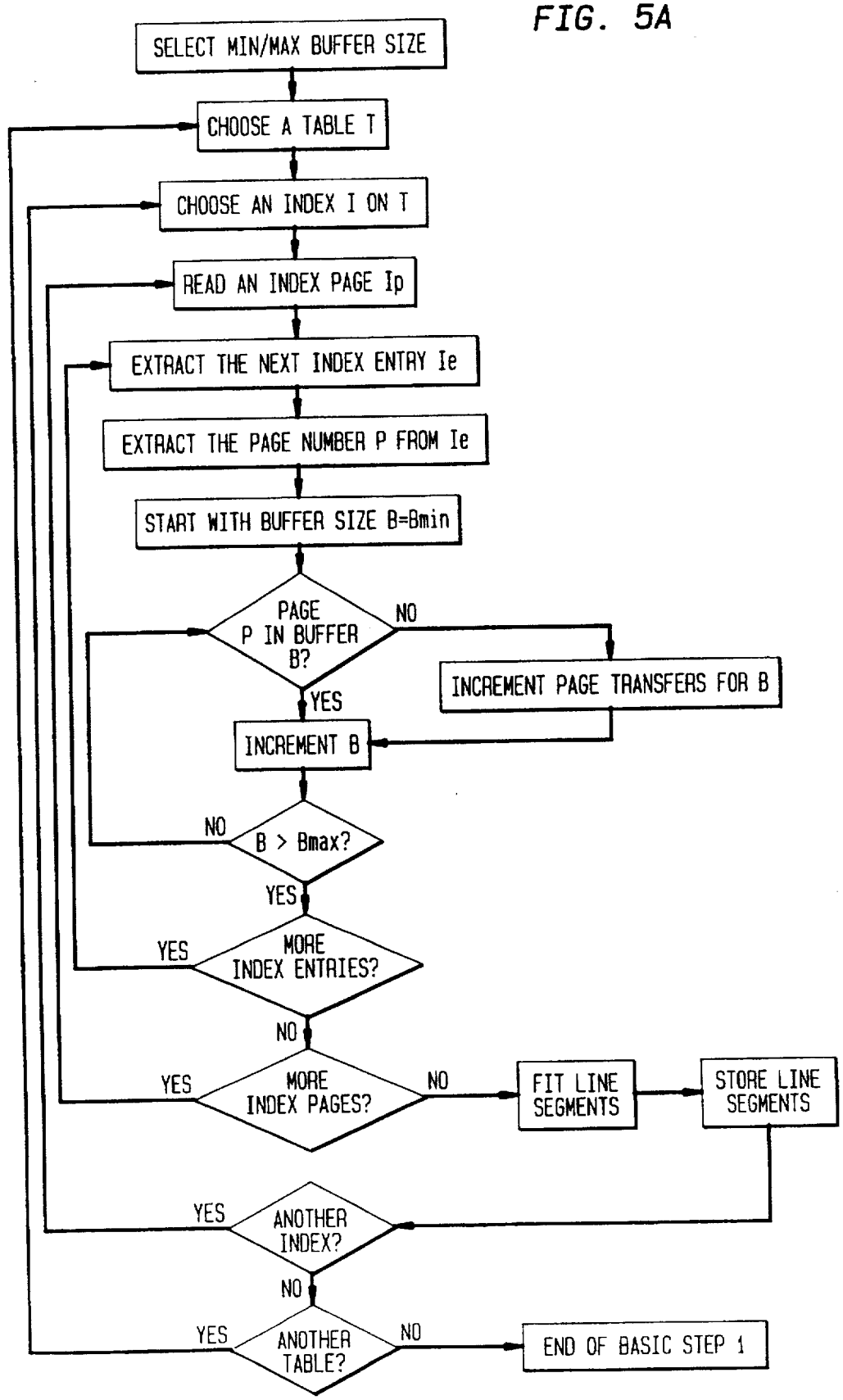
FIG. 5A depicts BASIC STEP 1.
Figure 5B:
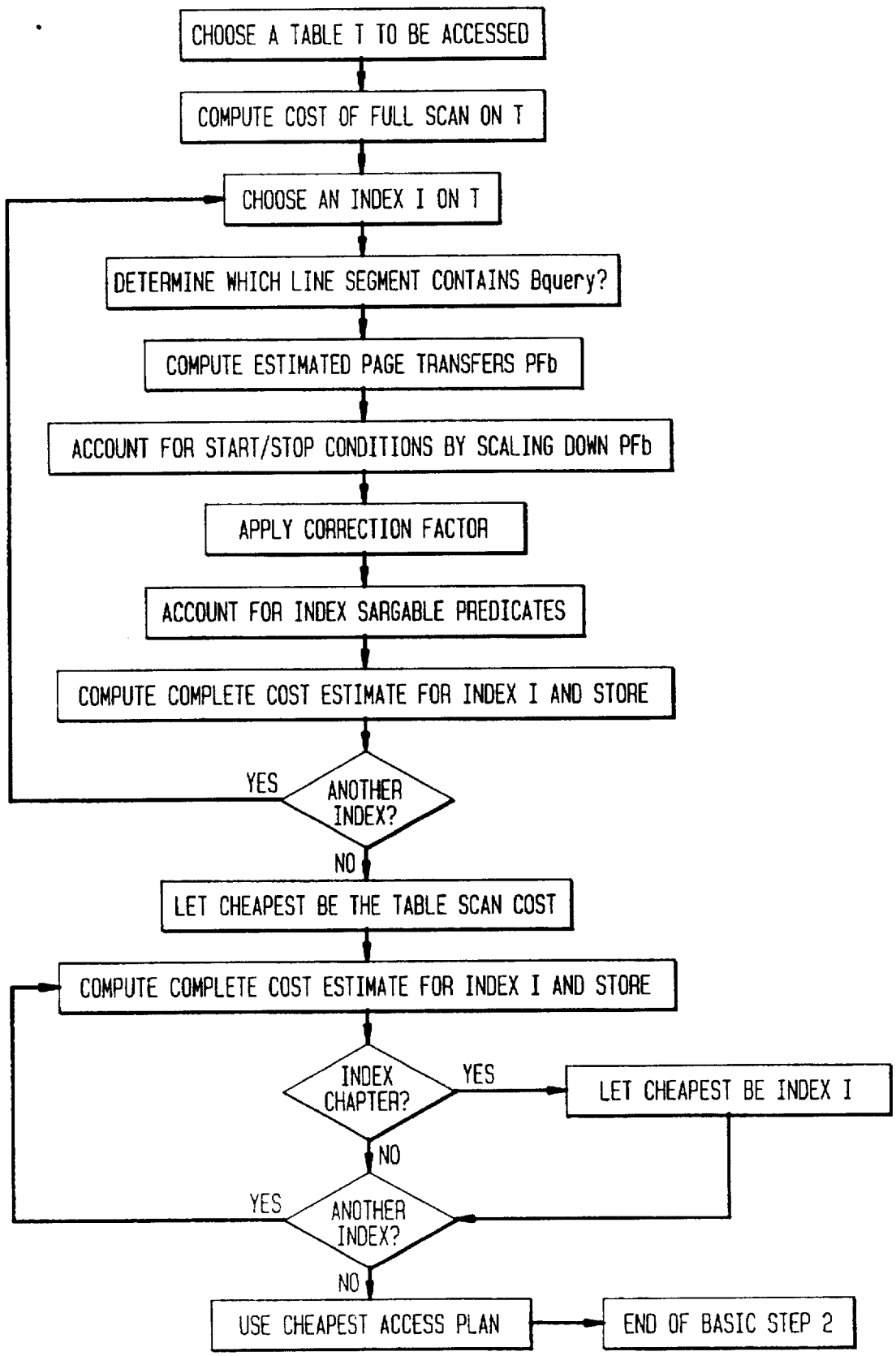
FIG. 5B depicts BASIC STEP 2.

In FIG. 4, we show how the number of page fetches for a full index scan varies with the buffer size. The curves are shown for indexes for columns of a sample set of tables. We refer to these curves as FPT (for Full index scan Page Transfer) curves. B (the size of the buffer pool) is expressed as a fraction of the number of pages T in the table. F (the number of page transfers) is expressed in relation to T. In FIG. 4 the page transfer multiplier (PTM) expresses the number of page fetches F normalized with respect to T. For a full index scan, the minimum value of F is T (in FIG. 4, this corresponds to a value of 1). We see that the value of P, can be quite sensitive to the buffer size B available. Note that for partial index scans, the number of page fetches can be less than T.

Hence, in order to choose a good access plan, it is important to accurately estimate the number of page transfers F for every relevant index I. The index scans may be partial or full index scans.

A number of factors are usually considered in selecting access paths using indexes. For instance an index can be defined on two columns a and b with a as the major column. Starting and stopping conditions frequently limit the index range that needs to be scanned. Examples of starting conditions are a>50 and a>=25. Examples of stopping conditions are a<75 and a<=100. Starting and stopping conditions can be combined, e.g., 40<=a AND a<60. Let the selectivity of the starting and stopping conditions be denoted by s.

We call have other predicates (search conditions) on the index columns that do not define a contiguous range of values and hence do not restrict the range of the index that needs to be scanned. Such predicates are referred to as index sargable predicates. An example of such a predicate is b=5. Let the selectivity of the index sargable predicates be denoted by S.

An index I on table T is said to be relevant if any of the following conditions are satisfied.

1. One or more of the predicates can be used to form starting and/or stopping conditions on I.
2. Records retrieved using I would be in the desired sort order.
3. Access through I can be used to separate records from the table T from other tables in the tablespace of T.

Note that a full index scan is not needed if the first condition is applicable. Hence, the optimizer may have several access plans to choose from:

1. Perform a table scan, evaluate the predicates on all the records. If necessary, sort the resulting set of records.
2. Use a partial index scan on a relevant index I and evaluate the unevaluated predicates on the resulting set of records. If necessary, sort the resulting set of records.
3. Use a full scan on a relevant index I to obtain the desired sort order and evaluate the predicates on the resulting set of records.

The number of basic access plans to be considered is the number of relevant indexes plus one (for the table scan).

In order to choose between the different access plans, the optimizer has to determine the costs of the different access plans. A major component of the cost of an access plan is the number of page fetches from secondary storage (disk) that are required under the plan. For an access plan involving an index scan, the optimizer has to estimate the number of page fetches (transfers).

Note that the number of records remaining after applying starting and stopping conditions and index sargable predicates forms an upper bound on the number of pages fetched (transferred). The number of qualifying records is given by the formula $N \times s \times S$.

The example below depicts a specific embodiment of the invention herein and when suitably embodied in a program for operating on a computer system containing a database comprised of tables and their associated indexes is capable of achieving advantages of the invention.

Example 1, below, shows a program fragment written in pseudocode for determining the fastest indexed access path for a table in accordance with one embodiment of this invention.

The following Notations will be used in the example:

| Term | |
|---|---|
| Notation | |
| Number of pages in buffer pool | B |
| Number of pages in table | T |
| Number of records in table | N |
| Number of distinct values in index | I |
| Number of pages accessed in scan on index | A |
| Number of pages fetched in scan on index | F |
| Selectivity of start and stop conditions | s |
| Selectivity of index sargable predicates | S |
| Clustering factor | C or CR |

| | | |
|---|---|---|
| Example 1 | Pseudocode Implementation of the Invention | |
| BASIC STEP 1 | (computing the FPT relationship) | |
| SUBSTEP 1 | (choosing the modelling range) | |
| 111 | Select a minimum buffer size to model, i.e. Bmin = max(0.01 × number of pages in the table, T and the smallest reasonable buffer pool size) | |
| 112 | Select a maximum buffer size to model, i.e. Bmax = min(the number of pages in the table, T user-supplied value) | |
| SUBSTEP 2 | (computing the relationship between required page transfers and the size of the buffer pool) | |
| 121 | Choose some table T | |
| 122 | Choose some index I that exists for table T | |
| 123 | For each index page Ip of index I | |
| 123.1 | Read index page Ip | |
| 124 | For each index entry Ie of Ip | |
| 124.1 | Obtain index entry Ie | |
| 125 | Extract the page number of P from the row identifier from Ie | |
| 126 | For each possible size of buffer pool BP | |
| 127 | If the page P cannot be found in BP then increment the number of page transfers required by a scan using a buffer pool of this size. | |
| 128 | End loop 127 | |

-continued

| | |
|---|---|
| 129 | End loop 124 |
| 1210 | End loop 123 |
| 1211 | Record the number of page transfers Fmin of the smallest buffer pool size Bmin and compute a clustering factor C using the formula C = (N − Fmin)/ (N − T) |
| SUBSTEP 3 | (fitting a line to the curve defined by the page transfer vs bufferpool size relationship determined by SUBSTEP 2) |
| 131 | Approximate the curve by breaking it into a discrete set of line segments (preferredly using the method of least squared error) |
| SUBSTEP 4 | (saving the line segment information) |
| 141 | Save the x,y coordinate endpoints of each line segment for later use |
| 142 | Repeat BASIC STEP 1 for all desired indexes and tables |
| BASIC STEP 2 | (using the computed FPT relationship from |
| BASIC STEP | 1. assign a cost associated with the potential use of an index or table scan for a particular table) |
| SUBSTEP 1 | (table scan cost computation) |
| 211 | Compute the cost of scanning the entire table T Comment: To do this account for both page transfers and CPU instructions to compute an estimate of the work required to read the entire table. Techniques for doing this are well known. |
| SUBSTEP 2 | (computing the cost of using each index) |
| 221 | Establish (Bquery) the appropriate size of the buffer pool for accessing this table by this particular query (this is done by an external routine of the database and is not part of this invention) |
| 222 | For each index I that exists for T |
| 223 | Using the FPT relationship that was computed in BASIC STEP 2 determine a set of two x,y coordinate pairs that include between their (x-axis) endpoints the Bquery value |
| 224 | Compute the estimated page transfers ($PF_B$) using the index under consideration for the current value of Bquery (a preferred method is interpolation) |
| 225 | Take into account the effect of any relevant starting and stopping conditions(this is a subset of the search criteria) by multiplying the estimated number of page transfers ($PF_B$) by the combined selectivity (filter factor) of all the starting/stopping conditions to reduce the estimated number of page transfers. $s \times PF_B$ |
| 226 | Apply a correction factor when<br>a) very few rows remain after applying search criteria<br>b) the buffer pool to table size (in pages) ratio is high<br>c) the index has a low degree of clustering<br>eg. by using the following formula which is well known in the art as Cardenas' formula:<br>$\begin{cases} 0 & \text{if } \phi < 3s \\ \min(1,\phi/(6s)) \times (1 - C) \times (T \times & \text{otherwise} \\ (1 - (1 - 1/T)s^N)) & \phi = \max(1,B/T) \end{cases}$ |
| 227 | Account for any remaining search criteria that can be applied prior to obtaining the data page. Therefore the final estimate of the number of page transfers required is given by:<br>$F = (1 - (1 - 1/Q)^k) \times ((s \times PF_B) + V \times \min(1,\phi/(6s)) \times (1 - C) \times (T \times (1 - (1 - 1/T)s^N)))$<br>where k in the number of qualifying rows after all search criteria which can be applied to the index page have been evaluated (k = SsN) |
| 228 | Compute a complete cost estimate of using this index using the estimated number of page fetches as one of the dominant cost components. |
| 229 | end loop 222 |
| SUBSTEP 3 | (choosing the least expensive access method) |
| 231 | Compare all the possible index scan costs as well as the cost of scanning the entire table and select the one with lowest cost. |

A discussion of the operation of the program fragment of Example 1 follows including additional information on specifics useful for application of the invention.

The invention illustrated in the pseudocode has two components. The first, BASIC STEP 1, is typically part of the statistical collection routines. It is called periodically to calculate some parameter values that can be stored. These parameter values are then used by the second component, BASIC STEP 2, which would be typically called by the optimizer during query compilation. It provides an estimate of page transfers for an index scan. We describe the two basic steps in more detail below.

BASIC STEP 1

BASIC STEP 1 first determines the range of buffer pool sizes that need to be modeled. It then obtains a table of FPF data in the range of interest. It approximates the FPF curve using some appropriate number of line segments. BASIC STEP 2 then uses the approximated FPF curve in the estimation of page transfers.

Determining Modeling Range (Pseudocode Routine 111, 112)

We need to know the range of buffer pool sizes (B) that are likely to be encountered during optimization. The optimizer will need accurate estimates of F, for these values of B. If desired, the range of B can be specified by the database administrator (DBA). If the range is not specified, BASIC STEP 1 chooses the range of B values to model as follows. For the most useful ranges of the invention the minimum value of B (denoted by Bmin) is taken to be max(0.01×T, Bsml), where Bsml is the minimum buffer pool size modeled. We have selected Bsml=12. The maximum value of B (denoted by Bmax) is taken to be T (the number of pages in the table).

BASIC STEP 1 will next determine the number of page fetches for a full index scan at selected B values in the range determined above. These B values are denoted by B1, B2, . . . Bk, with B1=Bmin and Bk=Bmax. The values B2, . . . , Bk−1 are equally spaced, with the distance between consecutive values being given by the following heuristic formula:

$$B_{inc} = 2 \times \sqrt{B_{max} - B_{min}}$$

This allows an increased number of buffer size values to be modeled for larger ranges but the increase is slower than the increase in the range size. B2 is the smallest multiple of Binc greater than Bmin and Bk−1 is the largest multiple of Binc smaller than Bmax.

Note that the method to be described allows us to generate useful page fetch estimates even if the buffer pool size falls outside of the range (Bmin . . . Bmax). The estimates may be less accurate outside this range but we have found that the invention can always obtain a useful estimate of the number of page transfers.

The FPT relationship applies to a specific index of a specific table therefor a table and an index must be selected and then processed (pseudocode steps 121, 122).

Obtaining the FPF Data (Pseudocode Steps 123, 1.23.1, . . . 1210)

A full scan of all the index entries produces the sequence of page numbers as stored in the index. A scan of the index for index statistics collection has these characteristics. The sequence of page accesses can be used to determine the number of page fetches that would result from a full index scan for any B value. In the art buffer pool modeling techniques [2] are known that can obtain page fetches for a number of buffer pool sizes in a single scan of the sequence. BASIC STEP 1 uses these techniques in order to generate the table of FPF data. For examples of FPF curves see FIG. 4. The table consists of (x, y) pairs where the x values are B1, B2, . . . Bk and the y values are the corresponding number of page transfer multipliers used to determine the total number of page transfers for a full index scan.

Approximating the FPF Data
(See Pseudocode 131, 141)

The FPF curve is used subsequently for estimation of page transfers in BASIC STEP 2. To reduce the amount of data that needs to be stored, we approximate the FPF curve. Any approximation method that permits sufficiently accurate approximation, e.g., polynomial curve fitting, splines, could be used. We use the simple but adequate method of approximating the FPF curve using line segments (see, for example, [3]). The line segment information is captured by storing the coordinates of the end-points of the line segments. This coordinate information can be stored in a system catalog entry associated with the index for later use by BASIC STEP 2.

Clearly, the larger the number of line segments, the more accurate the approximation. However, for each additional line segment, an additional pair of values needs to be stored in the catalog. If space usage in the catalog structure is of concern, it is desirable to keep the minimum number of line segments that, result in acceptable errors in page fetch estimation. We performed a large number of experiments on different indexes to study the sensitivity of the estimation errors to the number of approximating line segments. The experiments show that the estimation errors do not change very much when the number of line segments is greater than five. Hence, we use six (6) line segments to approximate the FPF curves.

Processing Additional Indexes
(See Pseudocode Line 142)

We have now completed the discussion of processing a single index and this procedure can be repeated for all other indexes of the table.

BASIC STEP 2

As discussed in Section 1, the optimizer often needs to choose between performing a table scan or a scan on one of the relevant indexes. For a relevant index 1, the optimizer determines the applicable search criteria. The optimizer also expects that the buffer size available for the scan to be some value B. In order to estimate the number of page fetches required for the scan on 1, the optimizer uses BASIC STEP 2.

BASIC STEP 2 uses the approximation to the FPF curve obtained by BASIC STEP 1. Let the number of page fetches resulting from a full scan on I, given a buffer size of B, be denoted by $PF_B$. BASIC STEP 2 first determines which line segment contains among its x values the value B. It then uses the equation for the line segment to calculate the corresponding number of page fetches. This is the value of $PF_B$. If B lies outside the range modeled by BASIC STEP 1, BASIC STEP 2 uses extrapolation of the appropriate boundary line segment to obtain a value for $PF_B$.

BASIC STEP 2 then scales down the value of $PF_B$ (see pseudocode step 225) appropriately in order to obtain the number of page fetches corresponding to the scan on I (possibly restricted by starting and stopping conditions if present). Thus, it estimates the page transfers by $$s \times PF_B$$

Correcting for Small Selectivity (s)
(pseudocode 226)

The calculation of number of transfers F tends to underestimate the number of page fetches when the following conditions hold:

1. The selectivity s is small.
2. $\phi = \max(1, T)$ s significantly greater than the selectivity s.
3. The index is not very clustered. This is reflected by a value of C not close to 1.

C is a clustering factor defined by the following formula:

$$C = (N - F_{min})/(N - T)$$

Where the number of page fetches for a buffer size of $B_{min}$ pages is denoted by $F_{min}$. BASIC STEP 1 also determined the value of $F_{min}$ (see pseudocode steps 1211).

C is a measure of how "clustered" the index is. If C=1 the index is perfectly clustered. The "degree" of clustering tends to increase as C approaches 1.

We take these observations into account by using a heuristic correction term that is calculated as follows:

$$\begin{cases} 0 & \text{if } \phi < 3s \\ \min(1, \phi/(6s)) \times (1-C) \times (T \times (1-(1-1/T)s^N)) & \text{otherwise} \\ & \phi = \max(1, B/T) \end{cases}$$

The factor $(T \times (1-(1-1/T)sN))$ is known in the literature as Cardenas' formula [4]. The more unclustered an index is, the mole likely it is that a partial index scan looks like a random selection. Note that if the index is very clustered, i.e., C is close to 1, the second factor (1–C) will be small. Hence, the factor (1–C) is a measure of how unclustered the index is and it is used to reduce Cardenas' estimate. The term $s \times PF_B$ tends to underestimate page transfers primarily when $\phi$ is large compared to s. The factor (1/6s) reduces the contribution of the second term if $\phi$ is not significantly larger than s.

Note that the second term will be significant only for small values of s. For example, it is always 0 for s>0.34. If the selectivity s is small, sN is small, the term corresponding to Cardenas' formula is small, and hence the second term will be tend to be small. Thus, the contribution of the second term to F, is usually not large.

Let us use the indicator variable V to denote the condition $\phi > 3s$. If the condition is true, then V is 1, otherwise it is 0. Then, the estimate we have for the number of page fetches is given by:

$$F = (1-(1-1/Q)^k) \times ((s \times PF_B) + V \times \min(1, \phi/(6s)) \times (1-C) \times (1 \times (1-(1-1/T)s^N)))$$

Effect of Index Sargable Predicates
(Pseudocode Step 227)

The index sargable search criteria are applied to the index column values inspected during the (partial) index scan (step 225). Those records that qualify are then fetched. Hence, such search criteria can have the effect of reducing the number of pages fetched. We use a simple urn model to estimate the effect of index sargable search criteria. We first need to estimate the number of pages referenced after applying the starting and stopping conditions.

If the index is highly clustered (C is approximately 1), the number of pages referenced is close to sT. If it is highly unclustered, the number of pages referenced is close to T. Using a simple linear model, we estimate the number of pages referenced after applying the starting and stopping conditions to be $$Q = CsT + (1-C)*\min(T, sN)$$

The number of qualifying records after index sargable search criteria are applied is k where $$k = SsN$$

The factor by which the number of pages referenced is reduced is $$(1-(1-1/Q)^k)$$

The number of page fetches is estimated to be reduced proportionately. The estimated number of page fetches F taking index sargable search criteria into account is:

$$F = (1-(1-1/Q)^k) \times ((s \times PF_B) + V \times \min(1, \sqrt{(6s)}) \times (1-C) \times (T \times (1-(1-1/T)s^N)))$$

Having computed F the number of page transfers we compute a final complete estimate of the processing required (the page fetches plus index pace transfers and associated computations) and thus the cost of using tthe index under consideration (step 228). This is repeated for each relevant index (step 229–222). The results from each index evaluation and the complete table scan are compared and the most cost effective one (the one with the least transfers) is chosen (step 231).

Overview

A useful embodiment of the invention consists of the following steps:

1. Determine the modeling range if not specified by the database administrator (DBA).
2. At statistics collection time, use LRU buffer pool modeling on the sequence of index page accesses to obtain the page fetches for different buffer pool sizes in the modeling range.
3. Approximate the table of page fetches, e.g., by a small number of line segments.
4. At query compilation time, use the line segment approximation to determine the number of page fetches for a full index scan. The buffer size is specified by the optimizer.
5. Scale down the full scan page fetches by the selectivity of the starting and stopping conditions.
6. If necessary, use the heuristic correction described above to compensate for small values of s. (eg. when only a small amount of data is being accessed from a table)
7. Account for the effect of index sargable search criteria on the number of page fetches if required.

Numerical Example

To better illustrate the usefulness and advantages of this invention, consider the following comparison of two indexed access paths, one (C2) having a 31% degree of clustering DC, and the other (C3) a 41% degree of clustering. Remember that in the prior art C3 would be considered a better access path than C2.

Assume that the table has 150,000 rows (NR=150,000), and that the rows are distributed over 21,000 data pages (NP=21,000). Assume further that tie indexes are equally selective, having a filter factor of two percent (FF=2%). Further, assume that each index has 150 leaf pages (NLP=150) in a tree of three levels (NL=3).

The estimated total page transfers incurred by using each index as the access path is then calculated as follows:

---

Comparison of Prior Art with The Invention for the Numerical Example

---

100 B = 1,000 (ie. 0.5T or 50% of T)
101 N = 150,000 rows (number of rows in the table)
102 T = 2,000 pages (number of pages in the table)
103 NLP = 150 (number of index pages)
104 NL = 3 (number of levels (height of tree in the indes))
105 s = .02 (selectivity of the search criteria)
106 DC = degree of clustering
107 (TPT) Total Page Transfers = Index Page Transfer + (DPT) Data Page Transfers
108 (IPT) Index Page Transfers = NL + s × NLP
109 (DPT) = s × DC × T + s × (1 − DC) × N
Table Scan (scan table from beginning to end)

TPT = IPT + DPT
= 0 (no index) + 2,000
Prior Art
Index Scan on C2 (column 2 of table C)

DC = .31 (31% degree of clustering)
TPT = IPT + DPT
= 6 (from 108) + (.02 × .31 × 2000 + .02 × (1 − .31) × 150,000) = 2088.4
Index Scan on C3 (column 3 of table C)

DC = .41 (41% clustering)
TPT = IPT + DPT
= 6 + (.02 × .41 × 2000 + .02 (1 − .41) × 150,000) = 1792.4
Index Page Transfer Estimation Under This Invention Index Scan on C2

| | |
|---|---|
| TPT = IPT + DPT<br>= 6 + s × PTM × T<br>= 6 + .02 × 2.5 × 2000 = | 106 |
| Note that PTM for C2 (2.5) was determined from FIG. 4 using the buffer size B = .5T. The correction factor calculated according to formula at pseudocode line 227 = | 128 |
| Total page transfer | 234 |

Index Scan on C3

| | |
|---|---|
| TPT = IPT + DPT<br>= 6 + s × PTM × T<br>= 6 + .02 × 4 × 2000 = | 166 |
| Correction Factor<br>(See pseudocode line 227) = | 110 |
| Total Page Transfers | 276 |

---

As can be readily seen the prior art which fails to take into account the buffer pool size greatly overestimates the number of page transfers required and also results in the optimizer making an incorrect selection of the index chosen for the access path. The prior would have chosen index C3 for which it calculated 1792.4 page transfers, but the invention shows that it would have been closer to 276 due to the large buffer pool. However, index C2 derives greater benefit from the large buffer pool and hence only requires 234 page transfering (which the prior art predicting 2088.4 did not select.) For large values of selectivity (s) (a greater fraction of rows qualifying (matching the search criteria) the correction factor would not contribute to the estimate of total number of page transfers.

REFERENCES

1. M. V. Mannino, P. Chu and T. Sager, Statistical Profile Estimation in Database Systems, ACM Computing Surveys, 20(3):191-221, September 1988.
2. R. L. Mattson, J. Gecsei, D. R. Slutz, and I. L. Traiger, Evaluation Techniques for Storage Hierarchies, IBM Systems Journal, 9(2):78-117, 1970.
3. B. K. Natarajan, On Piecewise Linear Approximations to Curves, Technical Report, Hewlett-Packard Laboratories, March 1991, Technical Report HPL-91-36.
4. A. F. Cardenas, Analysis and Performance of Inverted Database Structures, Communications of the ACM, 18(5):253-263, May 1975

It will be understood that this invention is not limited to relational data base queries, but can be readily applied to optimizing the access paths in joining relational data base tables. Further, the invention is considered to have value outside the field of relational data base management systems, in the broader realm of estimating page accesses in other data processing applications. It will be understood that outside the area of relational data bases, there is data commonly considered to be stored in "records", and other structures (analogous to the indexes described above) are used to access the records in sequences other than that in which they were stored.

Accordingly, the scope and protection of the invention is not limited except as by the following claims.

The embodiments of the invention in which an exclusive property or privilege is claimed are defined as follows:

1. A method for operating a data processing system having a processing unit and physical storage in which data is stored, said storage being operably connected to said processing unit for transferring pages of data to said processing unit, said storage containing at least one data base table stored on a plurality of pages, each said data base table having a plurality of rows of data, and one or more indexes composed of a sequence of entries which reference said rows, said processing unit having a memory associated with it, a portion of said memory comprising a buffer pool for caching data pages from said table, the method comprising the steps performed by said processing unit of:

(a) scanning one or more selected indexes and determining the relationship between the number of data transfers required to traverse all or a portion of each selected index and a selected range of buffer pool sizes;

(b) storing a description of said relationship; and (c) selecting an index to be used for a database query based on said description.

2. A method for operating a data processing system having a processing unit and physical storage in which data is stored, said storage being operably connected to said processing unit for transferring pages of data to said processing unit, said storage containing at least one data base table stored on a plurality of pages, each said data base table having a plurality of rows of data, and one or more indexes composed of a sequence of entries which reference said rows, said processing unit having a memory associated with it, a portion of said memory comprising a buffer pool for caching data pages from said table, the method comprising the steps performed by said processing unit of:

(a) scanning one or more selected indexes and determining the relationship between the number of data transfers required to traverse all or a portion of each selected index and a selected range of buffer pool sizes, and storing a description of said relationship;

(b) for a query submitted by a data base user determining the number of page transfers required to scan a whole table of interest, and;

(c) for each index of said table relevant to said query:

(1) determining the number of page transfers required to scan each said relevant index in accordance with the size of buffer pool made available for said query, as determined from said relationship;

(2) scaling down the number of page transfers required in proportion to a selectivity factor of any starting and stopping conditions present in search criteria in said query;

(3) applying a suitable correction factor to said number of page transfers if any of the following conditions are found:

(i) very few rows of data remain to be transferred after applying said search criteria;

(ii) said buffer pool to table size ratio is large, or;

(iii) an index being used has a low degree of clustering (4) accounting for the effect on said number of page transfers by any remaining index sargable search criteria;

(5) comparing the number of page transfers required for scanning of said relevant indexes and for scanning said entire table; and (6) selecting a search procedure from among said index scanning or table scanning that results in the least number of page transfers.

3. The method of claim 2 further including performing a search with said selected search procedure.

4. The method of claim 2 wherein said relationship between the number of page transfers and the range of sizes of the buffer pool is modelled by line segment fitting; determining the number of page transfers required to scan said selected index by interpolating values of the relationship between the endpoints of the line segment which straddles the selected buffer pool size for the query.

5. The method of claim 2 wherein said relationship between the number of page transfers and the range of sizes of the buffer pool is modelled by a polynomial equation.

6. A method for operating a data processing system having a processing unit and physical storage in which data is stored, said storage being operably connected to said processing unit for transferring pages of data to said processing unit, said storage containing at least one data base table stored on a plurality of pages, each said data base table having a plurality of rows of data, and one or more indexes composed of a sequence of entries which reference said rows, said processing unit having a memory associated with it, a portion of said memory comprising a buffer pool for caching data pages from said table, (a) for a query submitted by a data base user determining the number of page transfers required to scan a whole table of interest, and;

(b) for each index of said table relevant to said query:
  (1) determining the number of page transfers required to scan each said relevant index in accordance with the size of buffer pool made available for said query;
  (2) scaling down the number of page transfers required in proportion to a selectivity factor of any starting and stopping conditions present in search criteria in said query;
  (3) applying a suitable correction factor to said number of page transfers if any of the following conditions are found:
    (i) very few rows of data remain to be transferred after applying said search criteria;
    (ii) said buffer pool to table size ratio is large, or;
    (iii) an index being used has a low degree of clustering
  (4) accounting for the effect on said number of page transfers by any remaining search criteria including index sargable search criteria;
  (5) comparing the number of page transfers required for scanning of said relevant indexes and for scanning said entire table; and
  (6) selecting a search procedure from among said index scanning or table scanning that results in the least number of page transfers.

7. A method for operating a data processing system having a processing unit and physical storage in which data is stored, said storage being operably connected to said processing unit for transferring pages of data to said processing unit, said storage containing at least one data base table stored on a plurality of pages, each said data base table having a plurality of rows of data, and one or more indexes composed of a sequence of entries which reference said rows, said processing unit having a memory associated with it, a portion of said memory comprising a buffer pool for caching data pages from said table, the method comprising the steps performed by said processing unit of:

(a) for a query submitted by a data base user determining the number of page transfers required to scan a whole table of interest, and;

(b) for each index of said table relevant to said query:
  (1) determining the number of page transfers required to scan each said relevant index in accordance with the size of buffer pool made available for said query;
  (2) comparing the number of page transfers required for scanning of said relevant indexes and for scanning said entire table; and
  (3) selecting a search procedure from among said index scanning or table scanning that results in the least number of page transfers.

8. A method for operating a data processing system having a processing unit and physical storage in which data is stored, said storage being operably connected to said processing unit for transferring pages of data to said processing unit, said storage containing at least one data base table stored on a plurality of pages, each said data base table having a plurality of rows of data, and a plurality of indexes composed of a sequence of entries which reference said rows, said processing unit having a memory associated with it, a portion of said memory comprising a buffer pool for caching data pages from said table, the method comprising the steps performed by said processing unit of:

(a) scanning one or more selected indexes and determining the relationship between the number of data transfers required to traverse all or a portion of each selected index and a selected range of buffer pool sizes; and storing a description of said relationship;

(b) for a query submitted to said data base determining the number of page transfers required to scan a whole table of interest, and;

(c) for each index of said table relevant to said query:
  (1) determining the number of page transfers required to scan each said relevant index in accordance with the size of buffer pool made available for said query, as determined from said relationship;
  (2) comparing the number of page transfers required for scanning of said relevant indexes and for scanning said entire table; and
  (3) selecting a search procedure from among said index scanning or table scanning that results in the least number of page transfers.

9. The method of claim 8 further including for a submitted query before comparing the number of page transfers required the step of scaling down the number of page transfers required in proportion to the selectivity of any starting and stopping conditions present in search criteria in said query.

10. The method of claim 9 further including for a submitted query before comparing the number of page transfers required the step of applying a suitable correction factor to said number of page transfers if any of the following conditions are found:
  very few rows of data remain to be transferred after applying said search criteria;
  said buffer pool to table size ratio is large, or;
  an index being used has a low degree of clustering.

11. The method of claim 10 further including for a submitted query before comparing the number of page transfers required, the step of accounting for the effect on said number of page transfers by any remaining index sargable search criteria.

12. A method for operating a data processing system having a processing unit and physical storage in which data is stored, said storage being operably connected to said processing unit for transferring pages of data to said processing unit, said storage containing at least one data base table stored on a plurality of pages, each said data base table having a plurality of rows of data, and a plurality of indexes composed of a sequence of entries which reference said rows, said processing unit having a memory associated with it, a portion of said memory comprising a buffer pool for caching data pages from said table, the method comprising the steps performed by said processing unit of:

(a) scanning one or more selected indexes and determining the relationship between the number of data transfers required to traverse all or a portion of each selected index and a selected range of buffer pool sizes; and storing a description of said relationship; and (b) for a query submitted to said data base, for each index of said table relevant to said query:
  (1) determining the number of page transfers required to scan each said relevant index in accordance with the size of buffer pool made available for said query, as determined from said relationship;
  (2) comparing the number of page transfers required for scanning of said relevant indexes; and
  (3) selecting a search procedure from among said index scanning that results in the least number of page transfers.

13. The method of claim 11 further including for a submitted query before comparing the number of page transfers required the step of scaling down the number of page transfers required in proportion to the selectivity of any starting and stopping conditions present in search criteria in said query.

14. The method of claim 13 further including for a submitted query before comparing the number of page transfers required, the step of applying a suitable correction factor to said number of page transfers if any of the following conditions are found:

very few rows of data remain to be transferred after applying said search criteria;

said buffer pool to table size ratio is large, or;

an index being used has a low degree of clustering.

15. The method of claim 14 further including for a submitted query before comparing the number of page transfers required, the steps of accounting for the effect on said number of page transfers by any remaining index sargable search criteria.

* * * * *